US010949525B2

(12) United States Patent
Truong et al.

(10) Patent No.: US 10,949,525 B2
(45) Date of Patent: *Mar. 16, 2021

(54) GENERATING A CHALLENGE-RESPONSE FOR AUTHENTICATION USING RELATIONS AMONG OBJECTS

(71) Applicant: Capital One Services, LLC, McLean, VA (US)

(72) Inventors: Anh Truong, Champaign, IL (US); Vincent Pham, Champaign, IL (US); Galen Rafferty, Mahomet, IL (US); Jeremy Goodsitt, Champaign, IL (US); Mark Watson, Urbana, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,592

(22) Filed: Oct. 16, 2019

(65) Prior Publication Data

US 2021/0011989 A1 Jan. 14, 2021

Related U.S. Application Data

(63) Continuation of application No. 16/506,711, filed on Jul. 9, 2019, now Pat. No. 10,496,809.

(51) Int. Cl.

*G06F 21/36* (2013.01)
*G06N 20/00* (2019.01)

(Continued)

(52) U.S. Cl.

CPC ............ *G06F 21/36* (2013.01); *G06F 16/285* (2019.01); *G06N 20/00* (2019.01); *H04L 63/102* (2013.01); *G06F 2221/2133* (2013.01)

(58) Field of Classification Search

CPC ............. G06F 21/36; G06F 2221/2103; G06F 2221/2133; G06F 16/285; G06F 16/583;

(Continued)

(56) References Cited

U.S. PATENT DOCUMENTS 8,307,407 B2 11/2012 Jakobsson et al.
8,392,986 B1 3/2013 Gossweiler, III (Continued)

OTHER PUBLICATIONS

Thomas Claburn, "Talk about a GAN-do attitude . . . AI software bots can see through your text CAPTCHAs", The Register, Retrieved From https://www.theregister.co.uk/2018/12/05/ai_beats_captcha/, Published Dec. 5, 2018 (Year: 2018).

(Continued)

*Primary Examiner* — Abiy Getachew

(74) *Attorney, Agent, or Firm* — Banner & Witcoff, Ltd.

(57) ABSTRACT

Aspects described herein may allow for the application of generating captcha images using relations among objects. The objects in ground-truth images may be clustered based on the probabilities of co-occurrence. Further aspects described herein may provide for generating a first captcha image comprising a first object and a second object, and generating a second captcha image based on the first captcha image by replacing the first object with the third object. Finally, the first and second captcha images may be presented as security challenges and user access requests may be granted or denied based on responses to the security challenges.

20 Claims, 6 Drawing Sheets

(51) Int. Cl.
*H04L 29/06* (2006.01)
*G06F 16/28* (2019.01)

(58) Field of Classification Search
CPC ...... G06N 3/0454; G06N 3/088; G06N 20/00; G06N 3/0445; G06N 3/0472; G06N 3/084; G06N 7/005; G06T 7/194; G06T 11/00; G06T 11/60; G06T 2210/22; G06T 7/11; G06K 9/6257; G06K 9/6264; H04L 63/08; H04L 63/102; H04L 63/00
See application file for complete search history.

(56) References Cited

U.S. PATENT DOCUMENTS

| | | | | |
|---|---|---|---|---|
| 9,679,124 | B2 | 6/2017 | Malone | |
| 10,326,789 | B1 | 6/2019 | Vines et al. | |
| 10,496,809 | B1 | 12/2019 | Pham et al. | |
| 10,614,207 | B1 | 4/2020 | Truong et al. | |
| 2008/0063276 | A1* | 3/2008 | Vincent | G06K 9/6218 382/182 |
| 2009/0313694 | A1 | 12/2009 | Mates | |
| 2010/0031330 | A1 | 2/2010 | Von Ahn et al. | |
| 2012/0154434 | A1 | 6/2012 | Costea | |
| 2012/0189194 | A1 | 7/2012 | Srivastava | |
| 2012/0291122 | A1 | 11/2012 | Chow et al. | |
| 2012/0323700 | A1* | 12/2012 | Aleksandrovich | G06Q 30/00 705/14.69 |
| 2015/0161365 | A1 | 6/2015 | Hulten et al. | |
| 2015/0193631 | A1* | 7/2015 | Adams | G06F 21/62 726/30 |
| 2015/0269387 | A1 | 9/2015 | Cannarsa | |
| 2017/0316191 | A1 | 11/2017 | Sipos et al. | |
| 2019/0251243 | A1 | 8/2019 | Xiu et al. | |

OTHER PUBLICATIONS

Ye et al., "Yet Another Text Captcha Solver: A Generative Adversarial Network Based Approach", CCS '18 Proceedings of the 2018 ACM SIGSAC Conference on Computer and Communications Security, Published Oct. 2018. (Year: 2018).

* cited by examiner

400

GENERATING A CHALLENGE-RESPONSE FOR AUTHENTICATION USING RELATIONS AMONG OBJECTS

CROSS-REFERENCE TO RELATED APPLICATIONS

This application is a continuation of U.S. application Ser. No. 16/506,711, filed on Jul. 9, 2019, titled "Generating A Challenge-Response For Authentication Using Relations Among Objects." The contents of this application are incorporated by reference herein in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to machine learning and computer system security. More specifically, aspects of the disclosure may provide for generating security challenges using machine learning for assurance of human interaction in computing environment.

BACKGROUND

Due to the undesirable behaviors associated with software robots, many internet services may require CAPTCHAs (Completely Automated Public Tests to Tell Computers and Humans Apart) for security purposes. However, sufficiently advanced computer programs continue to evolve and they may decode a number of captcha images that have been proposed to date. In light of the limitations associated with the existing CAPTCHAs, there is a need for assuring human interactions via captcha images differentiating human users from automated bots.

Aspects described herein may address these and other problems, and generally improve the accuracy, efficiency, and speed of generating captcha images via Generative Adversarial Network (GAN) model, Auto-Encoders (AE), or Variational Auto-Encoders (VAE), and by offering improved model training, increasing the probability that the human may recognize these captcha images, while abating the probability that the computer programs may decode the same images.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

The techniques described herein may find application in GAN model, AE and VAE, and the discussion herein applies equally to each. Discussion will use the GAN model as an example, but the aspects described herein may be used in VAE and AE as well.

Aspects described herein may allow for using the GAN model to generate a challenge-response for authentication using relations among objects. The objects in the ground-truth images may be clustered based on probabilities of co-occurrence. The GAN model may be trained to refine a plurality of model parameters and generate captcha images with various objects based on relatedness of objects in the captcha images. This may have the effect of promoting the probability that the human may recognize the assembled captcha images, while abating the probability that the computer programs may decode these images. According to some aspects, these and other benefits may be achieved by extracting a plurality of objects from ground-truth images and clustering the plurality of objects based on probabilities of co-occurrence of each respective object with other objects in the ground-truth images. This may be effected by generating a first captcha image comprising a first object and a second object, generating a second captcha image with the first object being replaced with a third object, or swapping the positions of the first object and the second object. Subsequently, at least two challenge images comprising the first captcha image and the second captcha image may be transmitted to a user device as a security challenge. Based on a response to the security challenge, a user access request may be granted. In implementation, a first relatedness of the first object and the second object, and a second relatedness of the third object and the second object, may be determined based on the clustering. The first relatedness and the second relatedness may be compared to evaluate the response to the security challenge. According to some aspects, these and other benefits may be further achieved by determining a context of the objects based on the one or more ground-truth images, and assigning objects that co-occur in the context to a cluster.

Further aspects described herein may provide generating a plurality of first captcha images using a GAN model, which includes a generator and a discriminator. The GAN model may be trained to refine a plurality of model parameters. A plurality of second captcha images may be generated based on the trained GAN model. According to some aspects, the generator may generate training second captcha images by replacing the first object with the third object. The discriminator may evaluate the training second captcha images and the first captcha images, and the model parameters may be updated. The generator may generate new training second captcha images based on the updated model parameters. The discriminator may evaluate the new training second captcha images and the first captcha images to generate predictions of authenticity. Upon a determination that the predictions of authenticity reach a threshold value, the refined plurality of model parameters may be obtained. In some instances, the threshold value may correspond to a threshold probability that the discriminator is able to identify a training second captcha image as fake.

More particularly, some aspects described herein may provide a computer-implemented method for generating captcha images using GAN model and relations among objects and training the model to generate refined model parameters. The method may comprise extracting objects from ground-truth images. The objects may be clustered based on probabilities of co-occurrence of each respective object with other objects in the ground-truth images. The GAN model may be employed to generate first captcha images, and the GAN model may be trained to refine model parameters. Particularly, the GAN model may generate a set of objects as training data. The generator may generate training second captcha images by replacing an object in the first plurality of captcha images with training data. The discriminator may evaluate the training second captcha images and the first captcha images, to generate first predictions of authenticity. The model parameters may be updated based on the first predictions of authenticity. The generator may generate new training second captcha images based on the updated model parameters. The discriminator may evaluate the new training second captcha images and the first captcha images to generate second predictions of authenticity. The refined plurality of model parameters may be generated based on that the second predictions of authenticity reach a threshold value. Second captcha images may be generated based on the trained GAN model and the refined model parameters. Accordingly, at least two challenge images comprising the first captcha image and a second captcha image may be transmitted to a user device as a security challenge, and a determination may be made whether to authorize a user access request based on a response to the security challenge.

Aspects described herein may further allow for using AE or VAE to generate captcha images using variations of the same object. The AE or VAE may be trained to refine a plurality of model parameters, and generate variants of the objects with expected noise and blurriness to assemble the captcha images. The captcha images with the expected noise and blurriness may have the effect of promoting the probability that the human may recognize the assembled captcha images, while abating the probability the computer programs may decode these images.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

According to some aspects, the GAN model may generate variants of the objects and the backgrounds. The captcha images may be assembled from the variants of the objects and the backgrounds, adding blurs on boundaries of the objects and the backgrounds. Before discussing these concepts in greater detail, however, several examples of a computing device that may be used in implementing and/or otherwise providing various aspects of the disclosure will first be discussed with respect to FIG. 1.

Figure 1:
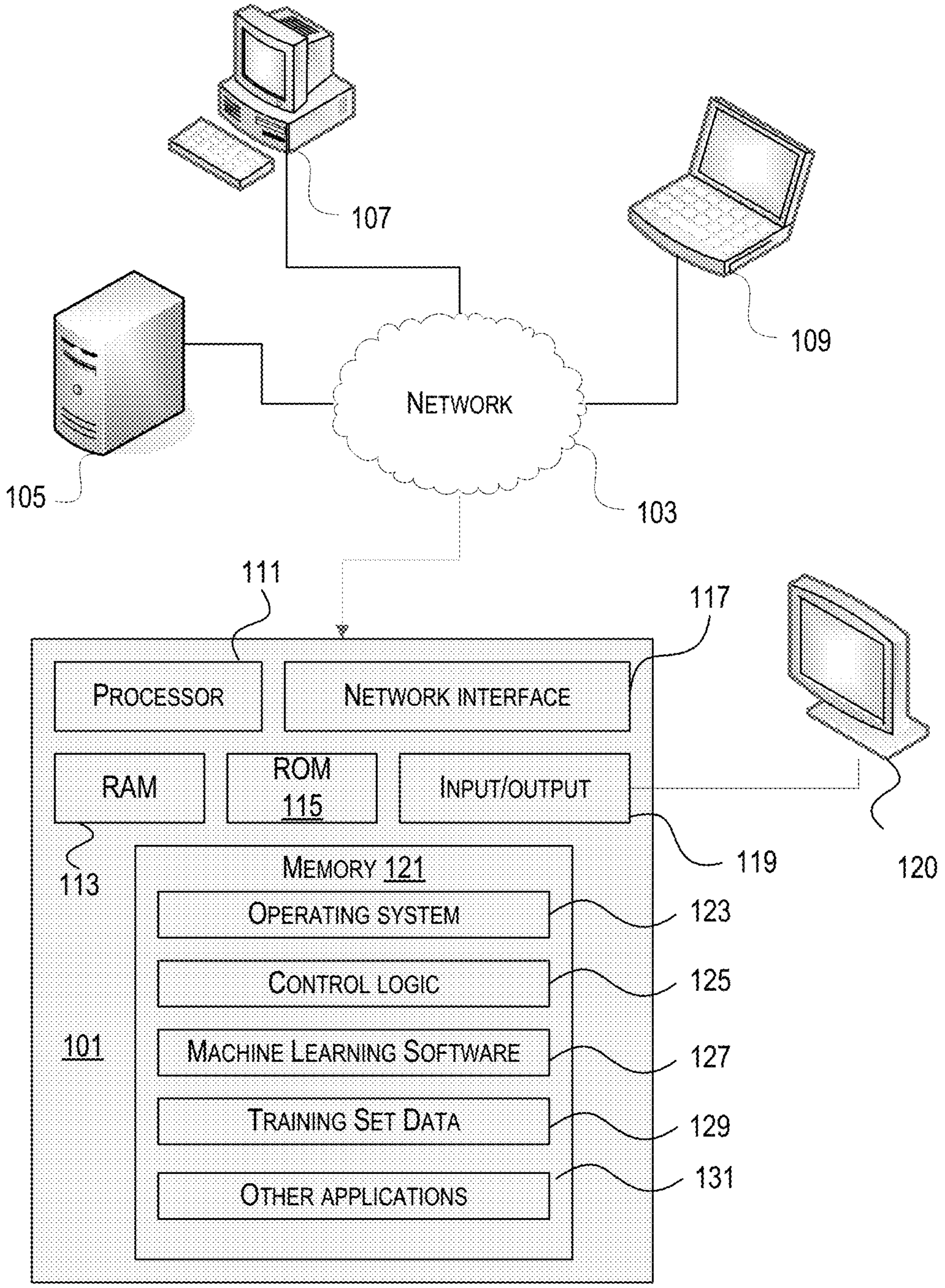
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for using GAN model to generate captcha images using variations of the same object.

Figure 2:
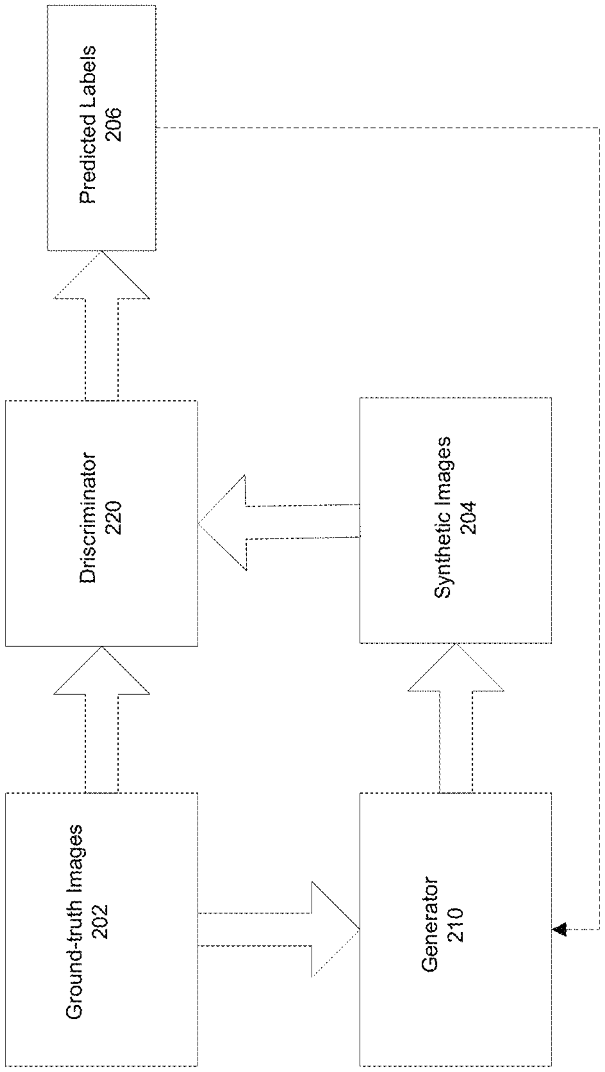
FIG. 2 depicts an example network architecture of a GAN model according to one or more aspects of the disclosure.

FIG. 2 illustrates an example network architecture 200 of a GAN model. A Generative Adversarial Network (GAN) model may be a class of machine learning systems that may include a generator 210 and a discriminator 220, which may contest with each other in a zero-sum game framework. Generator 210 or discriminator 220 may each be an artificial neural network, which may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Generator 210 may generate new data instances based on a training dataset such as ground-truth images 202, while discriminator 220 may evaluate them for authenticity. For example, discriminator 220 may decide whether each instance of data that it reviews belongs to the actual training dataset or not. Meanwhile, generator 210 may create new, synthetic images 204 that it passes to discriminator 220 in the hopes that these new synthetic images 204 will be deemed authentic, even though they are fake. The goal of generator 210 may be to generate passable synthetic images 204 and the goal of discriminator 220 may be to identify images coming from generator 210 as fake.

As illustrated in FIG. 2, generator 210 may take in ground-truth images 202 as a training dataset and return synthetic images 204. These generated images may be fed into discriminator 220 with ground-truth images 202. Discriminator 220 may take in both real and fake images and return predicted labels 206 such as real and fake. In some instances, predicted labels may be represented in probabilities, as a number between 0 and 1, with 1 representing a prediction of authenticity and 0 representing fake. In implementation, there may exist a double feedback loop, where discriminator 220 may be in a feedback loop with the ground-truth images, which are real, and generator 210 may be in a feedback loop with discriminator 220. In this dynamic process, each side may learn the other's methods in a constant escalation. Both generator 210 and discriminator 220 may optimize a different and opposing objective function, or loss function, in a zero-sum game—as discriminator 220 changes its behavior, so does the generator, and vice versa and their losses push against each other.

An artificial neural network in the GAN model may have an input layer, one or more hidden layers, and an output layer. The number of hidden layers employed. Generator 210 or discriminator 220 may vary based on the particular application and/or problem domain. For example, a network model used for image recognition in FIG. 2 may have a different number of hidden layers than a network used for speech recognition. Similarly, the number of input and/or output nodes may vary based on the application. Many types of artificial neural networks are used in practice, such as convolutional neural networks, recurrent neural networks, feed forward neural networks, combinations thereof, and others. Aspects described herein may be used with any type of artificial neural network, and for any suitable application.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model Other neural network architecture such as AE or VAE may be trained to generate the synthetic images. An AE model may be a neural network that may encompass an encoder that maps the input into the code, and a decoder that maps the code to a reconstruction of the original input. The AE model may include one or more hidden layers that describe a code used to represent the input and learn to copy the input to the output. A VAE may a generative model that includes of an encoder, a decoder, and a loss function. The VAE may be trained through its loss function and the aim of the autoencoder may be to select the encoder and decoder functions in such a way that it requires the minimal information to encode the image such that it be can regenerated on the other side. For example, if there are too few nodes in the bottleneck layer (the smallest layer in the network), the capacity to recreate the images may be limited and the regenerated images may be blurry or unrecognizable from the original. If there are too many nodes in the bottleneck layer, then there may be little point in using compression at all. As such, the loss functions and model parameters such as the number of nodes in the bottleneck layer may be tuned to generate images with expected noise and blurriness.

Figure 3:
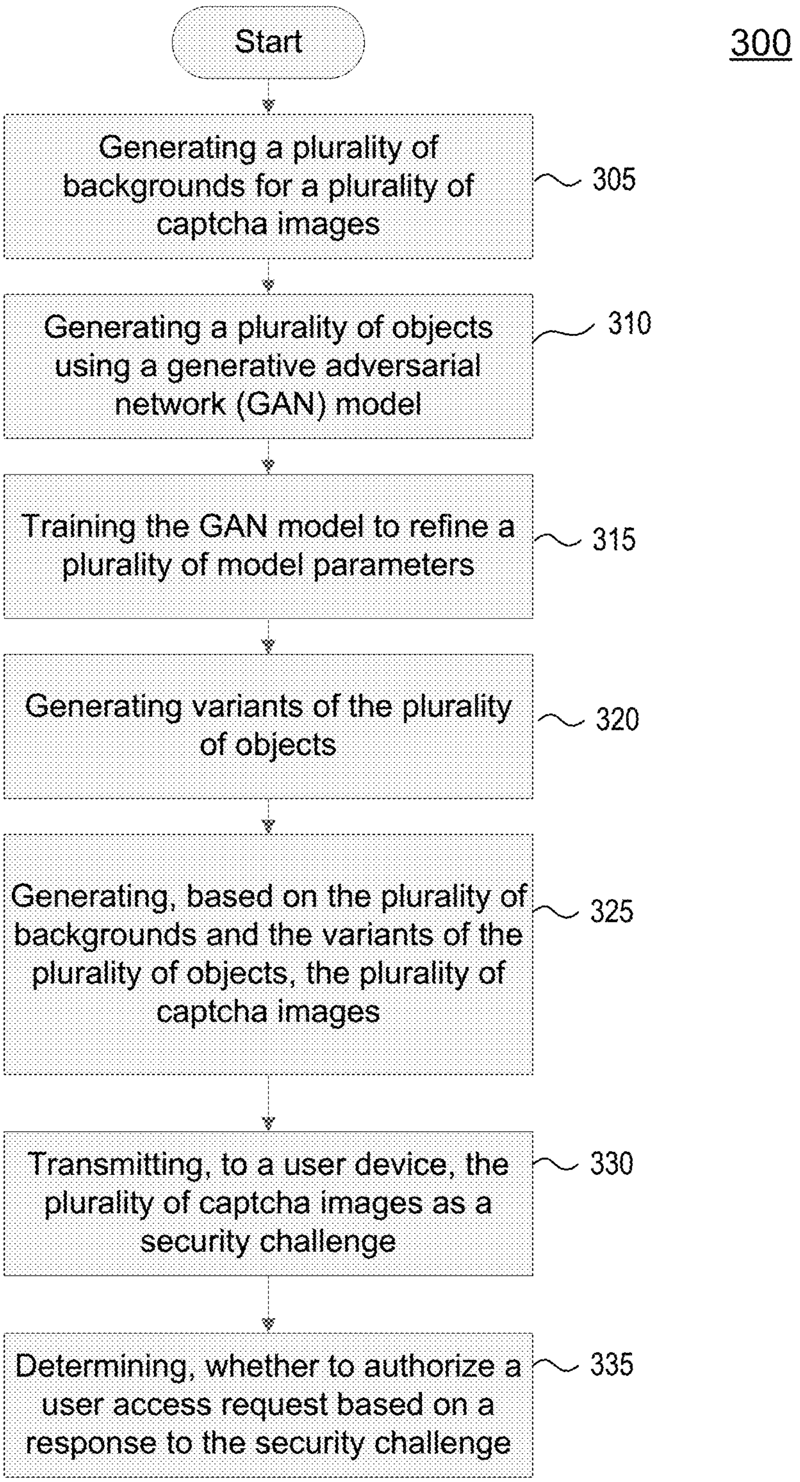
FIG. 3 depicts a flow chart for a method of generating captcha images using variations of the same object according to one or more aspects of the disclosure.

FIG. 3 illustrates a flow chart for a method of using the GAN model to generate captcha images using variations of the same object in accordance with one or more aspects described herein. Other models such as AE and VAE may be used to generate the captcha images using variations of the same object. As used herein (and as discussed above with respect to FIG. 2), the GAN model may include one or more generators and discriminators. Method 300 may be implemented by a suitable computing system, as described further herein. For example, method 300 may be implemented by any suitable computing environment by a computing device and/or combination of computing devices, such as computing devices 101, 105, 107, and 109 of FIG. 1. Method 300 may be implemented in suitable program instructions, such as in machine learning software 127, and may operate on a suitable training set, such as training set data 129.

At step 305, the system may generate a plurality of backgrounds for a plurality of captcha images. A captcha may be a type of challenge-response test used in computing to determine whether or not the user is human. A captcha image may include multiple sections, and a section may define how many segments there are within each section, the positions of the segments in the section, and the size of each segment. The sizes of the segments in the captcha may be the same or different. A segment may include a background and an object. The segments in a section may have a same size. Each segment may be assembled from one or more objects and a background. The system may extract backgrounds from ground-truth images for the captcha images, or the system may use GAN model, AE or VAE to generate the backgrounds and objects for the captcha images as described below. For example, the system may proceed from a special segment from the center of the captcha image, use the GAN model, AE or VAE model to generate the background and object for the center segment, and merge the background with the object. Ultimately, the system may repeat the process for the remaining segments to form a captcha image, based on the size and position of each segment. The system may generate the backgrounds for the various segments of the plurality of captcha images at step 305.

At step 310, the system may generate a plurality of object images using a generative adversarial network (GAN) model. The mode may have a GAN architecture comprising a generator and a discriminator as illustrated in FIG. 2. The generator and the discriminator may each be an artificial neural network. Each of their objectives may be expressed as a loss function that to be optimized via gradient descent, which may be a first-order iterative optimization algorithm for finding the minimum of a function. Given that the generator may be in a feedback loop with the discriminator, the result of their interactions may be that the generator and the discriminator each may improve their objectives in tandem. As a result of the optimization, the generator may generate the images that may fool the most sophisticated discriminator.

The system may generate a plurality of object images by extracting objects from ground-truth images. For example, the system may run a query against Google Images to generate images from different breeds of dogs. These images, which serve as ground-truth images may be captured at different light conditions including at night time or under less ideal light conditions. The system may process historical databases storing static ground-truth imagers. The system may dynamically generate ground-truth images based on different object databases and background databases. The system may collect object images in different brightness and colors and, using tools to rotate the images, create views at varying angles and use image cluttering to generate the object images.

The system may generate the object images using high dynamic range (HDR) imaging, image based lighting (IBL), and other techniques. For example, the system may create HDR images from sequences of low dynamic range (LDR) images and composite 3D models into the object images using image-based lighting and HDR tonemapping techniques. HDR photography may capture photographs containing a greater dynamic range than what normal photographs contain (i.e. they store pixel values outside of the standard LDR range of 0-255 and contain higher precision). The system may create HDR images by merging multiple LDR images at varying exposures.

HDR images may be widely used for a variety of applications, such as contrast enhancement, hyper-realistic art, post-process intensity adjustments, and image-based lighting, particularly relighting virtual objects. One way to relight an object may be to capture an 360 degree panoramic (omnidirectional) HDR photograph of a scene, which provides lighting information from all angles incident to the camera (hence the term image-based lighting). Capturing such an image may be difficult with standard cameras, which may need both panoramic image stitching and LDR to HDR conversion. One alternative may be to capture an HDR photograph of a spherical mirror, which provides the same omni-directional lighting information (up to some physical limitations dependent on sphere size and camera resolution). With this panoramic HDR image, the system may relight 3D models and composite them seamlessly into photographs. This may be a very quick method for inserting computer graphics models seamlessly into object images, which may be much faster and more accurate than manually "photoshopping" objects into the images.

Figure 4:
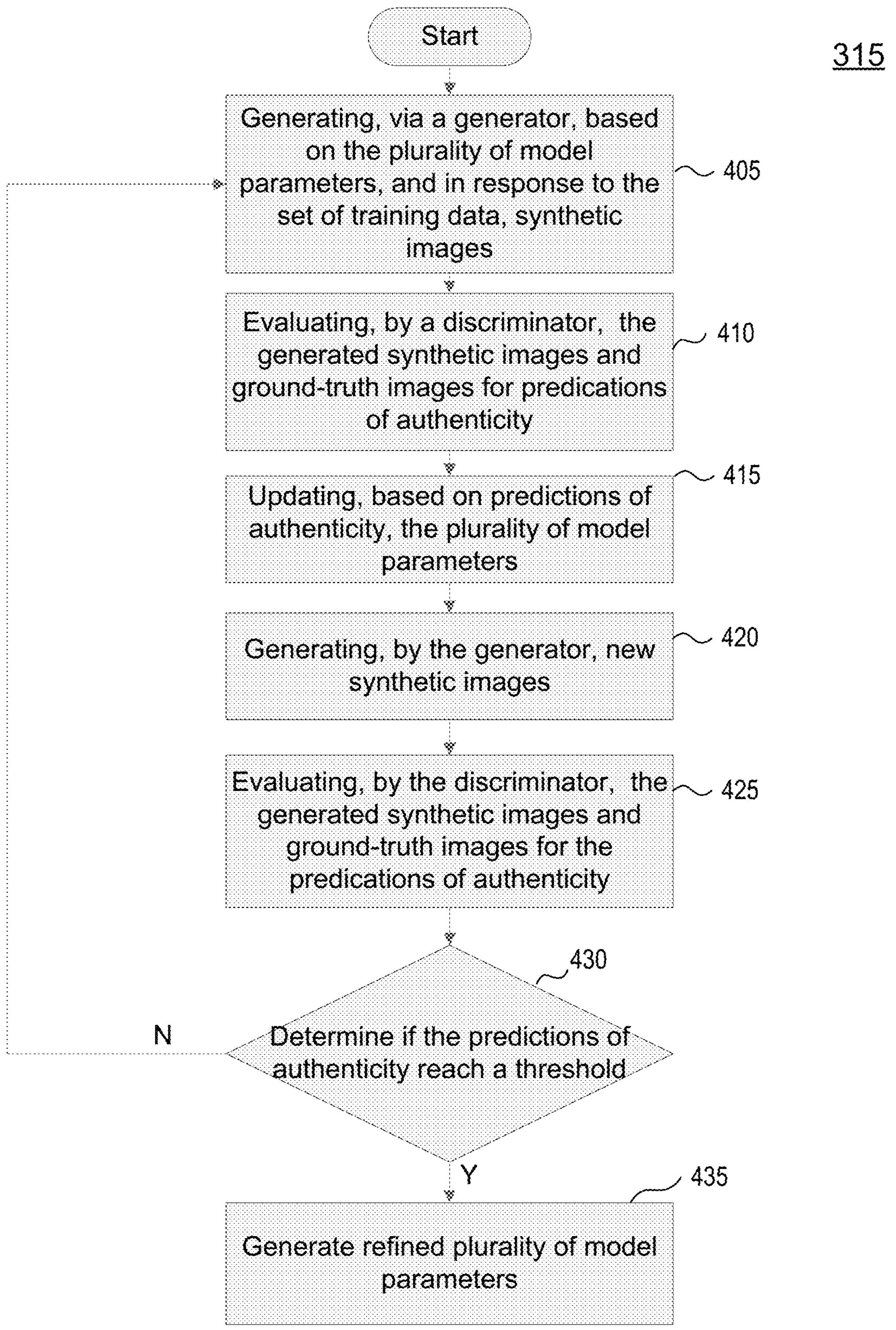
FIG. 4 depicts a flow chart for a method of training the GAN model according to one or more aspects of the disclosure.

At step 315, the system may train the GAN model to refine a plurality of model parameters based on a set of training data. The system may initiate a deep neural network model and the model parameters may correspond to weights assigned to nodes and connections in the model. The model may be initialized with initial model parameters that may be set randomly and/or to other initial values, such as a determined set of suitable white noise values. The system may also initialize an iteration count and select the set of training data. The training data may comprise a subset of randomly selected examples from the ground-truth images. The system may iteratively train the model through a model training process. FIG. 4 depicts a flow chart for a method of training the GAN model according to one or more aspects of the disclosure, which may be used to implement step 315.

Turning to step 405, the generator may generate synthetic images based on the plurality of GAN parameters and the set of training data. The generator may be a function that transforms an arbitrary input into a synthetic output. For example, an arbitrary input may be a 2D sample such as a ground-truth image, with a (x, y) value drawn from a uniform or Gaussian distribution, and the output may also a 2D sample, such as a synthetic image, but mapped into a different position, which is a fake sample. The mapping may be visualized using manifold, where the input space may be represented as a uniform square grid. As the function maps positions in the input space into new positions, the whole grid in the output, now consisting of irregular quadrangles, would look like a warped version of the original regular grid.

The area or density of each warped cell may have changed, and a very fine-grained manifold may look approximately the same as the visualization of the fake samples.

The generator may be implemented as a deep artificial neural network. The generator may take the objects images from the ground-truth images as input, using model parameters that may be set randomly and/or to other initial values, such as a determined set of suitable white noise values, to generate the synthetic images as outputs.

At step 410, the discriminator may evaluate the generated synthetic images and ground-truth images for predications of authenticity. The discriminator may be implemented as a multilayer perceptron (MLP), which is a deep neural network. It may be composed of more than one perceptron, which may be a classifier to perform binary classification and predict whether input belongs to a certain category of interest or not: fake or real. The MLP may be composed of an input layer to receive the signal, an output layer that makes a decision or prediction about the input, and in between those two, an arbitrary number of hidden layers that may be the true computational engine of the MLP. Multilayer perceptrons may be trained on a set of input-output pairs and learn to model the correlation and dependencies between those inputs and outputs.

At step 415, the system may update the plurality of model parameters based on predictions of authenticity. The system may adjust the parameters, or the weights and biases, of the model in order to minimize error in its prediction of authenticity. Backpropagation may be used to make those weight and bias adjustments relative to the error, and the error itself may be measured in a variety of ways, including by root mean squared error.

The MLP may be a feedforward network that involves two motions, a constant back and forth. In the forward pass, the signal flow may move from the input layer through the hidden layers to the output layer, and the decision of the output layer may be measured against the ground-truth labels. In the backward pass, using backpropagation and the chain rule of calculus, partial derivatives of the error function, the various weights and biases may be back-propagated through the MLP. That act of differentiation may provide a gradient, or a landscape of error, along which the parameters may be adjusted as they move the MLP one step closer to the error minimum. This may be done with any gradient-based optimization algorithm such as stochastic gradient descent. The network may keep evolving until the error can go no lower and may reach a state known as convergence.

At step 420, the system may start a second iteration, where the generator may generate new synthetic images based on the updated model parameters. The generator may use the updated model parameters to create more real-looking images or images more likely to cause confusion to the computer programs or bots. As such, the system may constantly change the way the generator generates the synthetic images, to stay ahead of the other machine learning model including the discriminator.

In this continuously updating process, the system may improve in each iteration, using the GAN model to generate improved synthetic images to stay ahead of the other machine learning model. In contrast, in the conventional approach that lacks a GAN implementation, as the images fed into the machine learning mechanism, and the machine learning algorithm may adapt over time and recognize the objects in the images. In contract, in this GAN approach, if the synthetic images fail to fool the discriminator, the generator may generate more complicated images, and the functionalities of the generator and discriminator may be inherently integrated. The discriminator may get better at recognizing the synthetic images, which may in turn promote the generator to create more real-looking images. In the second iteration, these new synthetic images may be sent as an input to the discriminator for further processing.

At step 425, the discriminator may evaluate the new synthetic images and ground-truth images for the predications of authenticity, similar to that of step 410.

At step 430, the system may determine whether predictions of authenticity reach a threshold value. The model training process may be configured with a tunable accuracy threshold and/or iterations threshold. The threshold value may correspond to a threshold probability that the discriminator is able to identify a synthetic image as fake. The system may set the threshold value at a level where the discriminator is unable to differentiate the synthetic images from the ground-truth images, but the synthetic images are still distinguishable to human perception.

The system may not be allowed to set the predictions of authenticity of the synthetic images that equal 100%. When the generator generates the synthetic images, the generator may be aware that there are X number of objects in the scene. When the discriminator tries to guess how many objects in the scene, the system may set the target so that the discriminator is correct, for example, 80% of the time. Given that the system may not allowed to set the discriminator to be perfectly accurate, there may be a minimal and maximal confidence level associated with the predictions of authenticity for the discriminator. The system may implement a mechanism so that the human users may recognize the images generated by the GAN model. When these images are employed as captcha images, they may have the opportunity to be applied to millions of users, who may function analogously to the discriminator in the GAN model. In this fashion, based on the sample set of the images generated by the GAN model, the users may serve as a human discriminator to calibrate the predictions of authenticity. For example, if the users are unable to identify the objects in the scene of the synthetic images, the system may tune the generator to generate less real-looking images. The system may roll back the GAN model to the previous version with the corresponding model parameters. Based on the feedback from human users, the GAN model may be tuned to generate the synthetic images so that the discriminator may identify these images as real or fake with the appropriate predictions of authenticity.

If the answer to step 430 is no, that the predictions of authenticity have not reached a desirable threshold value, the process may go to step 405, where the system proceeds with a new iteration of the training process and the generator may generate new synthetic images based on the new model parameters.

If the answer to step 430 is yes, that the predictions of authenticity have reached a threshold value, the process may go to step 435, where the system may generate refined model parameters based on the refined GAN model with appropriate predictions of authenticity. The refined model parameters may be based on the updated model parameters generated in step 415.

Referring back to FIG. 3, after the system has trained the GAN model at step 315 as illustrated in FIG. 4, the process may proceed to step 320, where the system may generate variants of the plurality of objects based on the trained GAN model. Based on the synthetic images generated by the generator, with the corresponding appropriate predictions of authenticity recognizable by the discriminator, the system may select one or more of the objects in the synthetic images as the variants of the objects. In the cases that there are a range of predictions of authenticity that satisfy the threshold value at step 430, the system may select a plurality of objects in the synthetic images as the variants.

At step 325, the system may generate, based on the plurality of backgrounds and the variants of the objects, a plurality of captcha images. As noted, the system may use the GAN model to generate variants of the background based on ground-truth images of the backgrounds in a similar fashion. The backgrounds may be originated from a ground-truth database different from an object database. The system may train the GAN model, based on a set of background training data, to refine the plurality of model parameters, and the system may generate variants of the plurality of backgrounds based on the refined plurality of model parameters.

The system may assemble the captcha images based on various objects and backgrounds. For example, the system may determine the number of segments in a captcha image, select one or more objects for each segment, and select one or more backgrounds for each segment. The system may merge the objects and the background together for each segment, and add blurs on boundaries of the objects and the backgrounds. For each segment or section of the captcha images, the system may select a different background for the segment.

The system may generate a plurality of captcha images based on variants of the object. For example, the system select an object from an object ground-truth image database, and a background from a background ground-truth image database. The system may assemble a ground-truth captcha image using the object and the background from ground-truth image databases. The system may assemble a ground-truth captcha image using a plurality of objects and a plurality of backgrounds from ground-truth image databases. The GAN model may generate variants of the object and variants of the background. The system may assemble a first synthetic captcha image using a first variant of the object and a first variant of the background. The system may generate a second synthetic captcha image using a second variant of the object and a third variant of the background. The system may generate a third synthetic captcha image using a third variant of the object and a background from the background ground-truth image database. The system may generate a fourth synthetic captcha image using a fourth variant of the object and a plurality of variants of the background. The system may generate a fifth synthetic captcha image using a plurality of variants of the objects and a plurality of variants of the backgrounds. These images noted above is for illustration purpose, and the system may use any combinations of the objects, the backgrounds and their variants to generate ground-truth captcha images and synthetic captcha images.

At step 330 the system may transmit, to a user device, the plurality of captcha images as a security challenge. The security challenge may also include one or more ground-truth images. For example, the security challenge may include five captcha images. The first captcha image may be a ground-truth image of a dog and a background. The second captcha image may be a synthetic captcha image including a first variant of the dog, and a first variant of the background in the first captcha image. The third captcha image may be a synthetic captcha image including a second variant of the dog, and a second variant of the background in the first captcha image. The fourth captcha image may be a synthetic captcha image including a third variant of the dog, and a third variant of the background in the first captcha image. The fifth captcha image may be a synthetic captcha image including a fourth variant of the dog and the background in the first captcha image. The security challenge may ask the user to identify the number of dogs in these five captcha images.

The security challenge may include a captcha image with a plurality of objects and backgrounds. For example, the captcha image may include five segments. The first segment may include a ground-truth image of a dog and a first background. The second segment may include a first variant of a cat and a second background. The third segment may include a first variant of the dog and a first variant of the first background. The fourth segment may include a second variant of the dog and a second variant of the first background. The fifth segment may include a second variant of the cat and a first variant of the second background. The security challenge may ask the user to identify the number of dogs in the captcha image. The security challenge may ask how many types of animals exist in the captcha image. The security challenge may ask whether the captcha image contains the same type of animals. These images noted above is for illustration purpose, and the system may use any combinations of the objects, the backgrounds and their variants in the captcha images and may ask any combinations of questions in the security challenges.

At step 335, the system may determine whether to authorize a user access request based on a response to the security challenge. The response may indicate a number of object types contained in the security challenge or whether the security challenge contains a same type of objects. Based on the response, the system may grant or deny the user access requests. For example, the captcha images may include five objects, a ground-truth image of a dog, three variants of the dog, and a variant of a cat. The security challenge may ask how many dogs exist in the captcha images. Given that the GAN model may generate the variants of the dog or cat with an appropriate prediction of authenticity, the human users may be able to distinguish the variants whether they are cats or dogs, while the bots or computer programs may not to identify. If the user provide the correct response that there are four dogs in the captcha images, the system may grant the access request to the underlying resources from the user. In contrast, the bots may only identify the image of the dog in the ground-truth image, and the response may be one, and the system may reject the access request from the bots.

Figure 5:
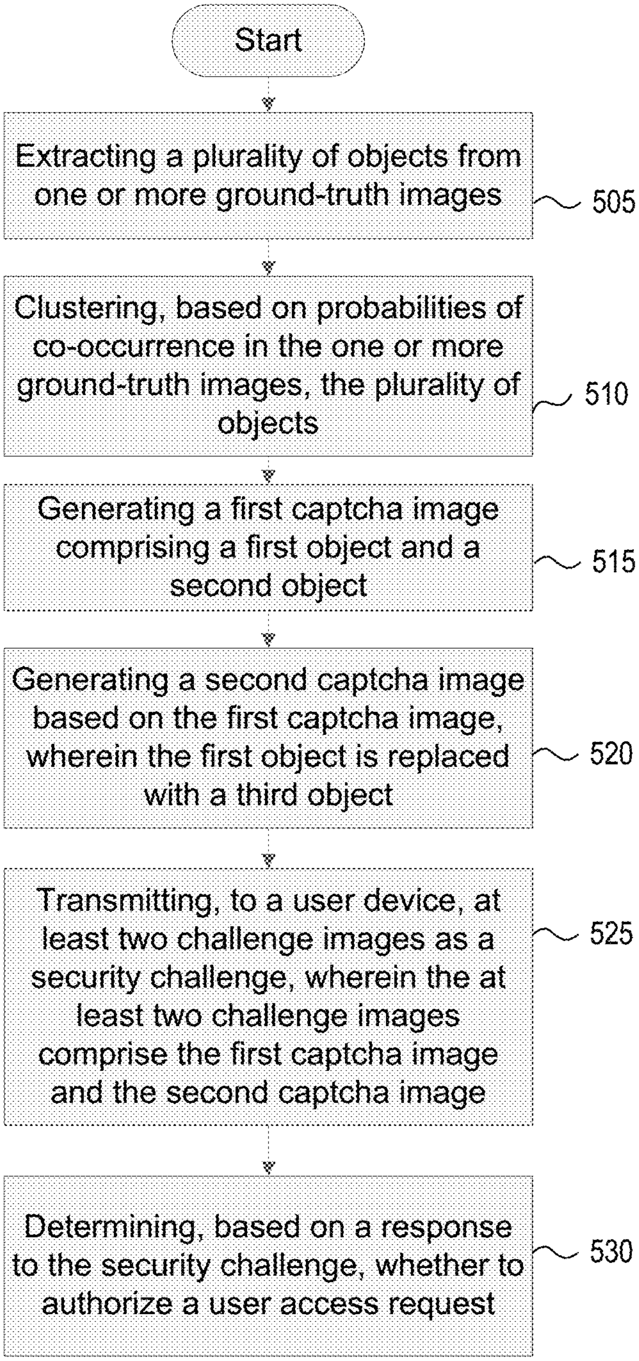
FIG. 5 depicts a flow chart for a method of generating captcha images using relations among objects according to one or more aspects of the disclosure.

FIG. 5 depicts a flow chart for a method of generating captcha images using relations among objects according to one or more aspects of the disclosure. At step 505, the system may extract a plurality of objects from one or more ground-truth images. The system may use the object database similar to the ground-truth image database storing the objects as discussed in FIGS. 3-4. The system may process the ground-truth images, determine the number of segments in each image, and the object in each segment of the image. The system may extract a list of the objects from the ground-truth images.

At step 510, the system may cluster the objects in the one or more ground-truth images, based on probabilities of co-occurrence of each respective object with other objects in the one or more ground-truth images. The system may determine a context of the scenes in a ground-truth image. For example, an image may contain several scenes: a dining table with food, plate on the table and people holding knives, forks and spoons, which the system may determine a dining room context for the objects in the ground-truth image. For an image containing sofa surrounding a TV, and people seating on the sofa, eating popcorn and watching TV, the system may determine a living room or entertainment room context for the objects in the image. For an image containing pillow and blanket on a bed, and people lying on the bed with heads on the pillow and covered by a blanket, the system may determine a bedroom context for the objects in the image. Based on the one or more ground-truth images, the system may determine a domestic context including the dining room context, the living room context and the bedroom context.

The system may cluster the objects based on the probabilities that an object may co-occur with objects in the scenes of the ground-truth images. An example may be shown in Table A below:

| Object A | Object B | Probability of Co-Occurrence |
|---|---|---|
| Cat | Sofa | 10% |
| Cat | Child | 8% |
| Lion | Sofa | 0.01% |
| Lion | Child | 0.001% |

As illustrated in Table A, based on the co-occurrence of objects in the ground-truth images, an object A, such as a cat, may have a high probability (8%) to occur together with an object B such as a child in a scene. In contrast, an object A, such as a lion, may have a low probability (0.001%) to occur together in a scene with an object B such as a child.

The system may cluster the objects based on the context of the images, assigning the objects that co-occur in the context to a cluster. The system may assign different weight factors to various clusters based on the contexts. For example, in clustering an object such as a cat in the images, the system may assign a larger weight factor to the living room context that the cat co-occurs with a sofa; the system may assign a smaller weight factor to the dining room context that the cat co-occurs with a knife or a fork. The system may establish an object database that store the clustering information of the objects extracted from the ground-truth image. The probabilities of co-occurrence may be used as a proxy to determine the relatedness of one object to another object in the object database, as discussed in details below.

At step 515, the system may generate a first captcha image comprising a first object and a second object. The system may retrieve the first object and the second object that have been observed to occur together in a scene of a ground-truth image. The system may retrieve the first object and the second object from the same cluster such as in a living room context or in a domestic context. The system may retrieve the first object and second object from the different clusters, where the two objects have not been observed to occur together in a scene, but may be likely to occur together via their connections through other objects. For example, a cat may be observed in a living room cluster, while a dog may be observed in a bedroom cluster. The cat and dog may still be connected in a domestic context, regardless there may lack an image showing the cat and a dog together in a scene.

In some implementations, the system may use GAN model as described with regard to FIGS. 2-4 to generate the first captcha image selecting the first object and the second object from the object database. Based on a probability of co-occurrence, the generator may determine a relatedness of the first object to the second object. To initiate the iteration of the model training, the generator may select a random probability of co-occurrence or a value above a threshold (such as >1%) to select the first and the second objects from the object database. Likewise, the generator may select one or more backgrounds from a background database to merge with the selected objects to create the first captcha image. The system may select additional objects besides the first object and the second object to be merged with the background of the first captcha image. These additional objects may be from the same cluster or context of the first object and the second object. In some implementations, the system may use AE or VAE as described with regard to FIG. 2 to generate the first captcha image based on the first object and the second object from the object database.

At step 520, the system may generate a second captcha image based on the first captcha image, wherein the first object may be replaced with a third object. The first object and third object may be selected from different clusters of objects. For example, the first object, such as a cat, and the second object, such as a child, may be both originated from a cluster corresponding to a domestic context. The system may select a third object, such as a lion, from a cluster corresponding to the wild animal context, and the cat may be replaced by the lion to generate the second captcha image.

The second captcha image may be generated by swapping the positions of the first object and the second object. In this case, the third object is the second object, and the first object is replaced by the third object. The second object is subsequently replaced by the first object. The system may define a one-way directed relationship between two objects and swamping these two objects may make an image not as likely to be real as the ground-truth image. For example, in a ground-truth image, a man is looking at a picture on the wall and there is a lion in the picture. The system may swap the positions of the lion and the man to generate the second captcha image, which may produce an image likely to be fake. Although the first object and the second object belong to the same cluster, the system would recognize that the second captcha image is likely to be fake. In another example, in the ground-truth image, a woman is pushing the stroller and there is a baby in the stroller. The system may swap the positions of the objects (the woman and the baby), to generate a second captcha image that is less likely to be real.

In some implementations, the system may use GAN model as described with regard to FIGS. 2-4 to generate the second captcha image selecting the third object from the object database. In some implementations, the system may use AE and VAE as described to generate the second captcha image selecting the third object from the object database. Based on a probability of co-occurrence, the generator may determine a relatedness of the third object to the second object. The generator may select the third object from a different cluster of that the first object belongs. The third object may be more remotely related to the second object (the relatedness between the first and second objects is greater than the relatedness between the third and second objects.) The generator may use the GAN model to select the ground-truth images and swap the positions of the first object and the third object to generate the second captcha images that are less likely to be real.

The GAN model may proceed with the training process as described in FIG. 4. The system may use objects in the ground-truth images as training data. Based on a set of initial model parameters and the first captcha images, and in response to the training data, the generator may generate training second captcha images by replacing the first object with a third object selected from the training data, or swapping the positions of the first object and the second object. The discriminator may evaluate the training second captcha images and the plurality of first captcha images to generate first predictions of authenticity whether the first captcha images and the training second captcha images are real or fake. The system may update the model parameters based on the first predictions of authenticity. Subsequently, the generator may generate new training second captcha images based on the updated plurality of model parameters. Likewise, the discriminator may evaluate the new training second captcha images and the first captcha images to generate second predictions of authenticity. Upon a determination that the second predictions of authenticity reach a threshold value, such as a threshold probability that the discriminator is able to identify a synthetic image as fake with 80% of accuracy, the system may generate the refined model parameters based on the updated plurality of model parameters, and the new training second captcha images as the second captcha images. In generating the first captcha image and the second captcha images, the system may select a different background for each section/segment of the first and second captcha images. In the training process, the system may receive feedback from users to calibrate the discriminator, where the users may act as human discriminator to train the GAN model. After the GAN model is trained properly, the system proceeds to step 525.

At step 525, the system may transmit, to a user device, at least two challenge images as a security challenge, where the at least two challenge images may comprise the first captcha image and the second captcha image. The system may ask the users, which of the two challenge images is more likely to occur. For example, the first captcha image may include a cat and a child in a scene, while the second captcha image may present a lion and a child in a scene, the system may ask the user which scene is more likely to occur in a natural setting.

In addition to asking the users to identify which of the first and the second captcha images is likely to be real, the system may present a plurality of captcha images to the user, and ask how many of the captcha images in the challenge images are likely to be real.

Figure 6:
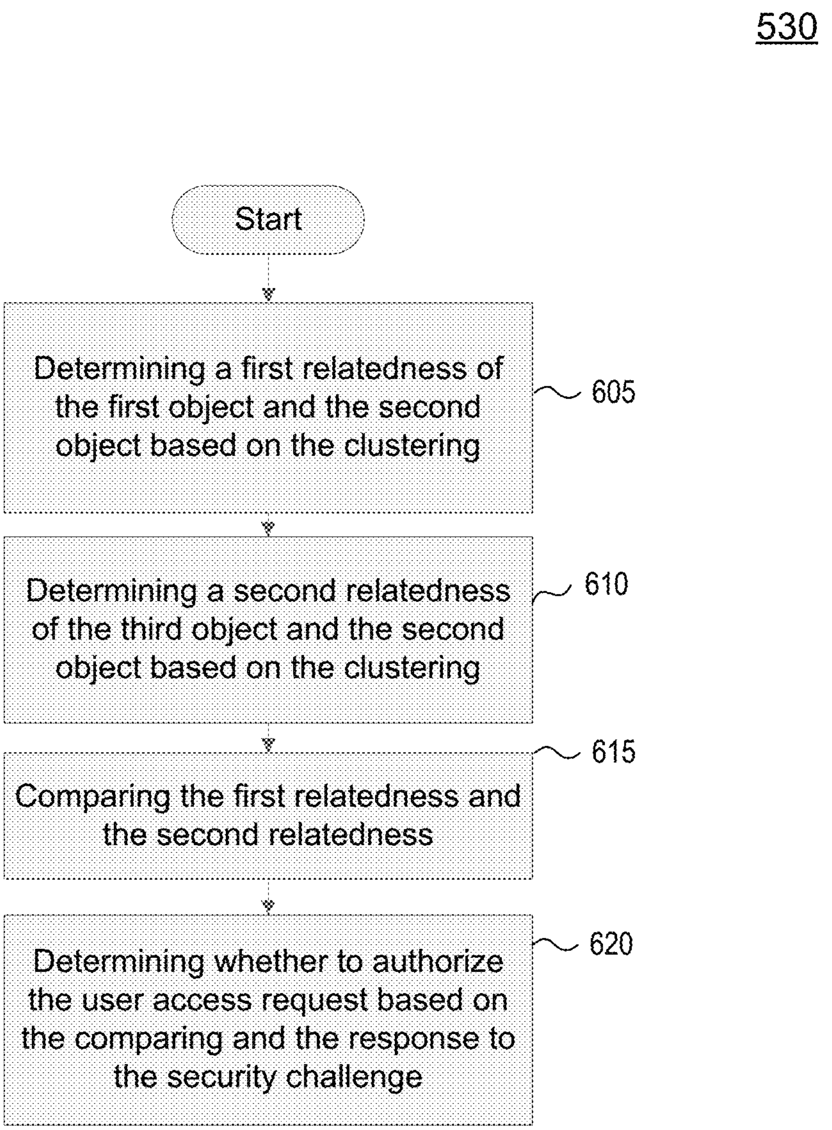
FIG. 6 depicts example flow chart for a method to determine relations among objects in accordance with one or more illustrative aspects discussed herein.

At step 530, the system may determine, based on a response from a user to the security challenge, whether to authorize a user access request. The system may make a decision based on the process illustrated in FIG. 6. At step 605, the system may determine a first relatedness of the first object and the second object based on the clustering. For example, the system may determine that the first relatedness of the cat and a child is 0.08 based on the probability of co-occurrence as illustrated in Table A. At step 610, the system may determine a second relatedness of the third object and the second object based on the clustering. For example, the system may determine that the second relatedness of the lion and a child is 0.00001. At step 615, the system may compare the first relatedness and the second relatedness and determine that the first relatedness corresponding to the first captcha image is more likely to occur. In some implementation, if the first relatedness and second relatedness is too close to call, the system may use the relatedness to the additional objects in the backgrounds of the captcha images to facilitate the determination.

Based on the comparison of the first and second relatedness, at step 620, the system may receive a response to the security challenge and determine whether the user have provide the proper response to authorize the user access request to some resources, such as an access a website, to a security account or an enterprise resource.

Some aspects described herein may provide benefits for generating captcha images using variants of the same object. The system may use the GAN model, AE or VAE to generate the objects and the backgrounds of the images through the interactions of the generator and the discriminator. The system may take consideration of the feedback from numerous users, who may serve as a human discriminator of the GAN model to provide further guidance to fine tune the model parameters. After the training process, the system may generate captcha images that would circumvent the most sophisticated machine learning algorithms who may pose as human users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
- extracting a plurality of objects from one or more ground-truth images;
- clustering, based on probabilities of co-occurrence of each respective object of the plurality of objects with other objects of the plurality of objects in the one or more ground-truth images, the plurality of objects;
- generating an initial captcha image based on the plurality of objects, wherein the initial captcha image comprises a first object and a second object;
- generating a synthetic captcha image by replacing the first object in the initial captcha image with a third object of the plurality of objects;
- transmitting, to a user device, at least two challenge images as a security challenge, wherein the at least two challenge images comprise the initial captcha image and the synthetic captcha image; and
- determining, based on a response to the security challenge, whether to authorize a user access request.

2. The method of claim 1, wherein determining whether to authorize the user access request comprises:
- determining a first relatedness of the first object and the second object based on the clustering;
- determining a second relatedness of the third object and the second object based on the clustering;
- comparing the first relatedness and the second relatedness; and
- determining whether to authorize the user access request based on the comparing and the response to the security challenge.

3. The method of claim 1, wherein clustering the plurality of objects comprises:
- determining a context of the plurality of objects based on the one or more ground-truth images; and
- assigning objects that co-occur in the context to a cluster of objects associated with the context.

4. The method of claim 1, wherein generating the synthetic captcha image comprises:
- generating a plurality of first captcha images using a generative adversarial network (GAN) model, wherein the GAN model has a GAN architecture comprising a generator and a discriminator;
- training the GAN model, based on the plurality of first captcha images, to refine a plurality of model parameters; and
- generating, based on the trained GAN model and the refined plurality of model parameters, a plurality of second captcha images.

5. The method of claim 4, wherein training the GAN model comprises:
generating a set of objects, from the plurality of objects, as training data;
generating, by the generator, based on the plurality of model parameters and the plurality of first captcha images, and in response to the training data, training second captcha images by replacing the first object with training data;
evaluating, by the discriminator, the training second captcha images and the plurality of first captcha images, to generate first predictions of authenticity;
updating, based on the first predictions of authenticity, the plurality of model parameters;
generating, by the generator and based on the updated plurality of model parameters, new training second captcha images;
evaluating, by the discriminator, the new training second captcha images and the plurality of first captcha images to generate second predictions of authenticity; and
generating, based on that the second predictions of authenticity reach a threshold value, the refined plurality of model parameters.

6. The method of claim 5, wherein the threshold value corresponds to a threshold probability that the discriminator is able to identify a training second captcha image as fake.

7. The method of claim 5, wherein updating, based on the first predictions of authenticity, the plurality of model parameters further comprises:
receiving, from a plurality of users, responses to the security challenge;
determining, an accuracy rate in the responses, wherein the accuracy rate is determined based on a number of users that correctly identify the initial captcha image from the synthetic captcha image in the security challenge;
comparing the first predictions of authenticity by the discriminator with the accuracy rate; and
updating, based on the comparing, the plurality of model parameters.

8. The method of claim 1, wherein the response indicates a number of captcha images that are likely to be real.

9. The method of claim 1, wherein the response indicates which of the initial captcha image and the synthetic captcha image is likely to be real.

10. The method of claim 1, wherein generating the initial captcha image comprises adding blurs on boundaries of the plurality of the objects and a plurality of backgrounds.

11. The method of claim 1, wherein generating the initial captcha image comprises selecting a different background for each section of the initial captcha image.

12. The method of claim 1, wherein clustering the plurality of objects comprises:
assigning different weight factors to different clusters of objects.

13. An apparatus comprising:
a database configured to store ground-truth images;
one or more processors; and
memory storing instructions that, when executed by the one or more processors, cause the apparatus to:
extract a plurality of objects from one or more ground-truth images;
cluster, based on probabilities of co-occurrence of each respective object of the plurality of objects with other objects of the plurality of objects in the one or more ground-truth images, the plurality of objects;
generate an initial captcha image from the plurality of objects, wherein the initial captcha image comprises a first object and a second object;
generate a synthetic captcha image from the plurality of objects by replacing the first object in the initial captcha image with a third object of the plurality of objects;
transmit, to a user device, at least two challenge images as a security challenge, wherein the at least two challenge images comprise the initial captcha image and the synthetic captcha image; and
determine, based on a response to the security challenge, whether to authorize a user access request by:
determining a first relatedness of the first object and the second object based on the clustering;
determining a second relatedness of the third object and the second object based on the clustering;
comparing the first relatedness and the second relatedness; and
determining, based on the comparing and the response to the security challenge, whether to authorize the user access.

14. The apparatus of claim 13, wherein the instructions cause the apparatus to:
determine a context of the plurality of objects based on the one or more ground-truth images; and
assign objects, that co-occur in the context, to a cluster of objects associated with the context.

15. The apparatus of claim 13, wherein the instructions cause the apparatus to:
generate a plurality of first captcha images using a generative adversarial network (GAN) model, wherein the GAN model has a GAN architecture comprising a generator and a discriminator;
train the GAN model, based on the plurality of first captcha images, to refine a plurality of model parameters; and
generate, based on the trained GAN model and the refined plurality of model parameters, a plurality of second captcha images.

16. The apparatus of claim 15, wherein the instructions cause the apparatus to:
generate a set of objects, from the plurality of objects, as training data;
generate, by the generator, based on the plurality of model parameters and the plurality of first captcha images, and in response to the training data, training second captcha images by replacing the first object with training data;
evaluate, by the discriminator, the training second captcha images and the plurality of first captcha images, to generate first predictions of authenticity;
update, based on the first predictions of authenticity, the plurality of model parameters;
generate, by the generator and based on the updated plurality of model parameters, new training second captcha images;
evaluate, by the discriminator, the new training second captcha images and the plurality of first captcha images to generate second predictions of authenticity; and
generate, based on that the second predictions of authenticity reach a threshold value, the refined plurality of model parameters.

17. The apparatus of claim 16, wherein the threshold value corresponds to a threshold probability that the discriminator is able to identify a training second captcha image as fake.

18. The apparatus of claim 13, wherein the response indicates a number of captcha images that are likely to be real.

19. The apparatus of claim 13, wherein the response indicates which of the initial captcha image and the synthetic captcha image is likely to be real.

20. One or more non-transitory media storing instructions that, when executed by one or more processors, cause the one or more processors to perform steps comprising:

extracting a plurality of objects from one or more ground-truth images;

clustering, based on probabilities of co-occurrence of each respective object of the plurality of objects with other objects of the plurality of objects in the one or more ground-truth images, the plurality of objects;

generating a plurality of first captcha images using a generative adversarial network (GAN) model, wherein the GAN model has a GAN architecture comprising a generator and a discriminator;

generating, using the GAN model, a plurality of second captcha images by replacing a first set of objects in the plurality of first captcha images with a second set of objects;

transmitting, to a user device, at least two challenge images as a security challenge, wherein the at least two challenge images comprise a first captcha image from the plurality of first captcha images and a second captcha image from the plurality of second captcha images; and determining, based on a response to the security challenge, whether to authorize a user access request.

* * * * *